Patented June 8, 1926.

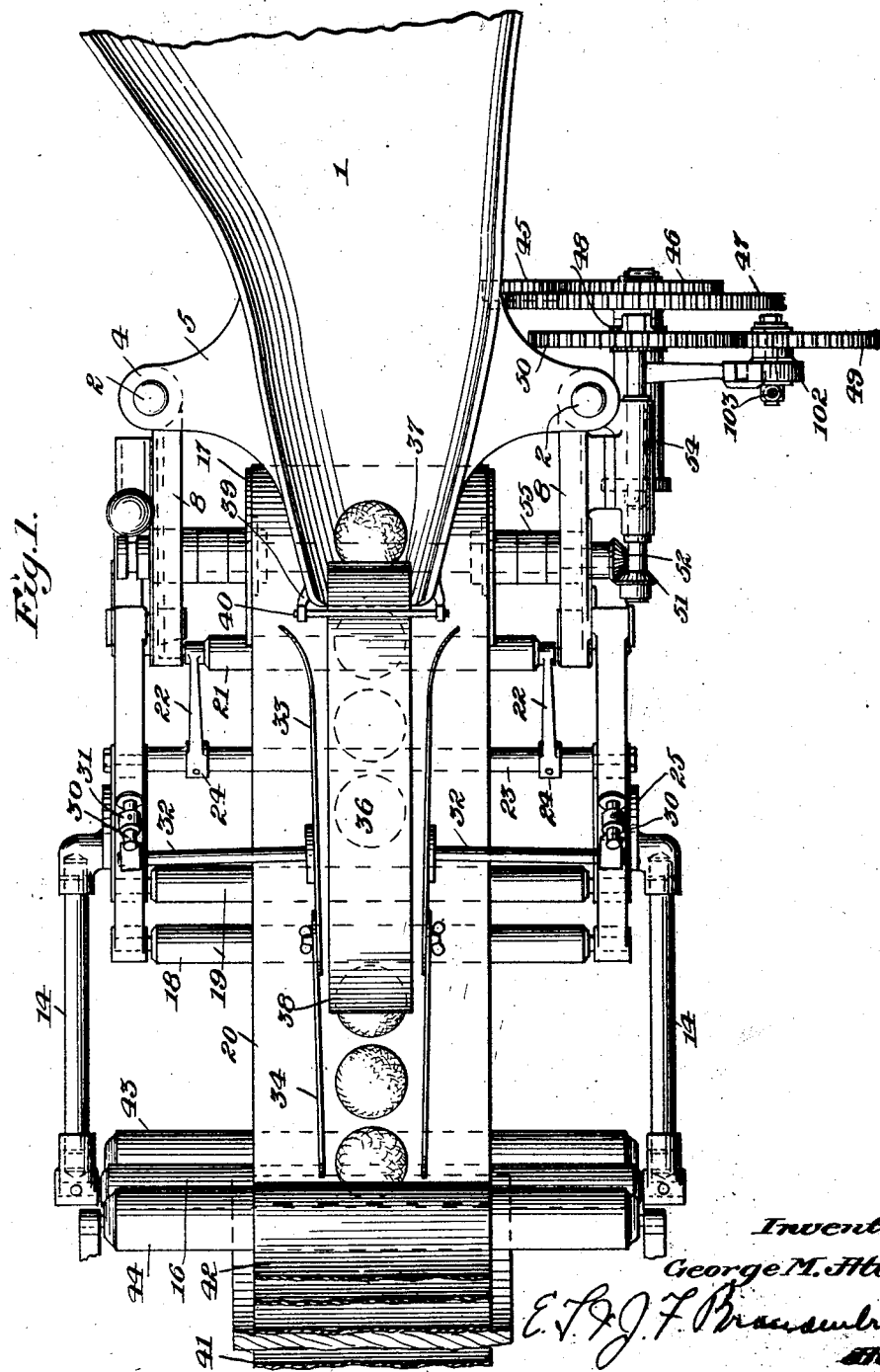

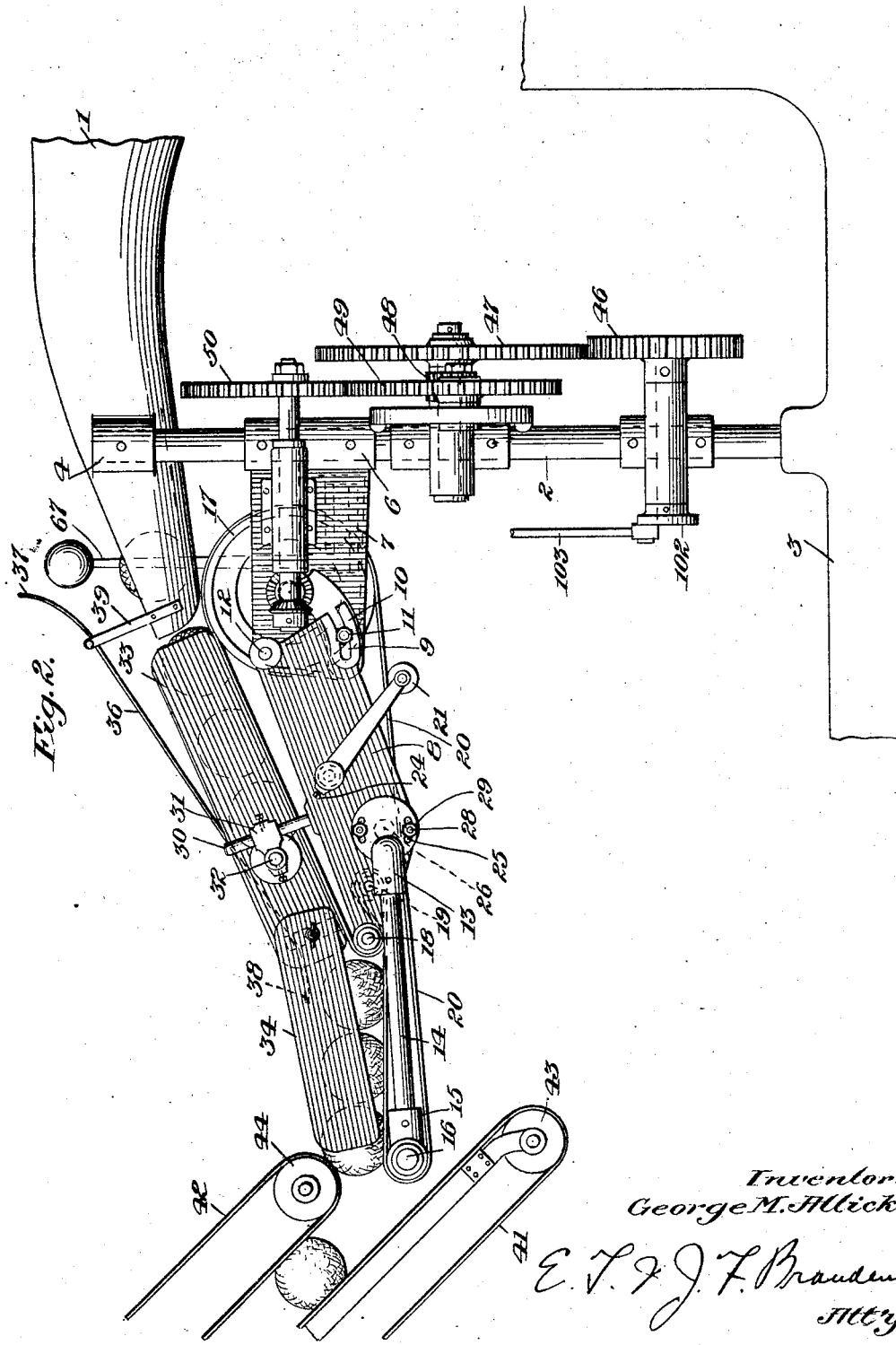

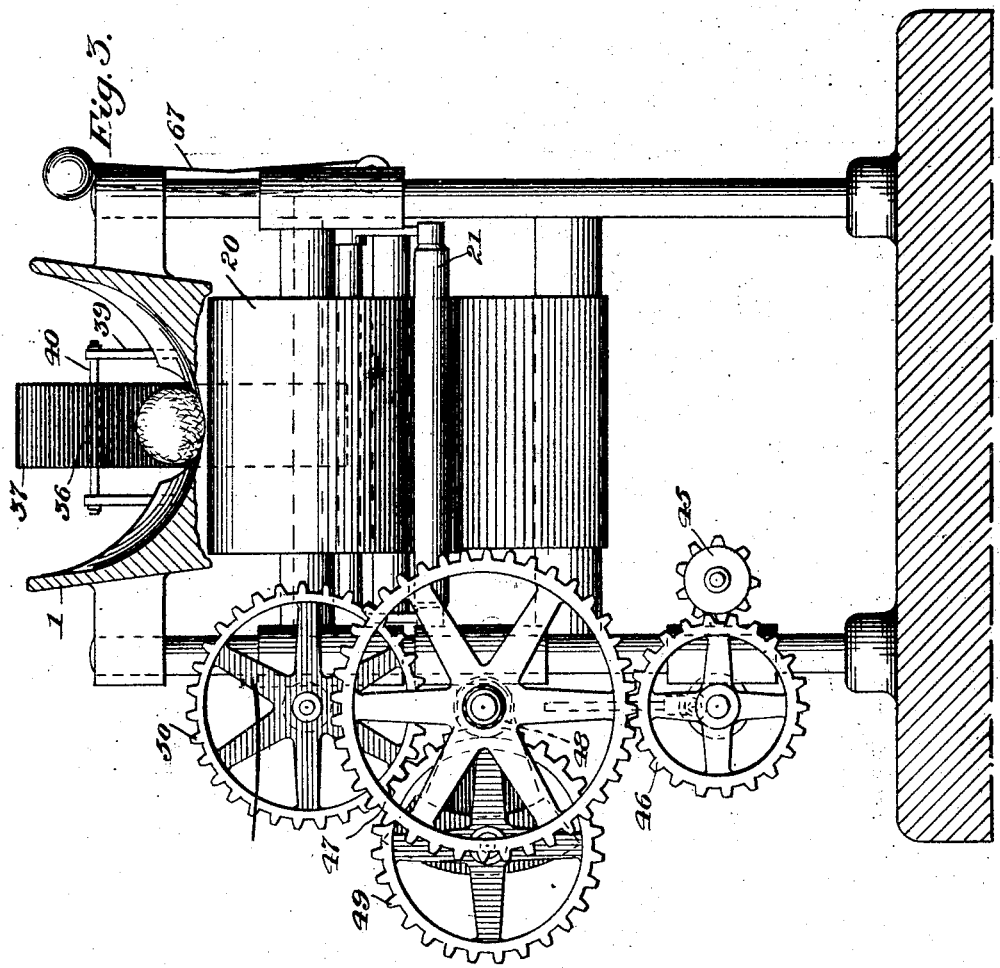
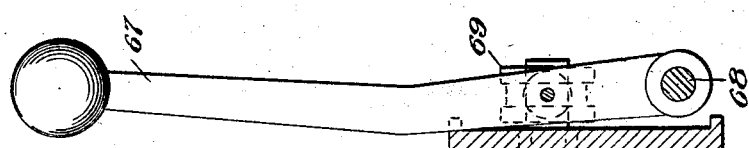
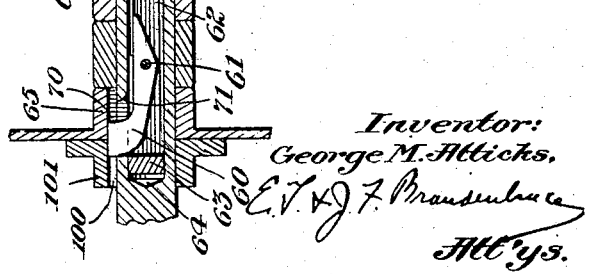

1,588,085

UNITED STATES PATENT OFFICE.

GEORGE M. ATTICKS, OF LEMOYNE, PENNSYLVANIA, ASSIGNOR OF ONE-HALF TO MANBECK BAKING COMPANY, A CORPORATION OF PENNSYLVANIA.

DOUGH-BALL-SPACING MACHINE.

Application filed August 13, 1925. Serial No. 49,959.

The invention to be hereinafter described relates to machines for spacing lumps or balls of dough to prevent two or more sticking together or doubling as it is more generally termed—briefly; a dough ball spacing machine.

In the bakery art, and more particularly, in bread baking, the dough is formed into lumps or balls of approximately the same size. It has been common practice in the past to deliver these balls from the point at which they are made, to a conveyor leading to the proving machine, by placing them close together on a belt travelling at a uniform speed and cooperating with a second belt travelling at an appreciably faster rate, the balls falling by gravity from the slower belt to the faster, the greater speed of the latter belt, of course, providing spaces between the successive balls which, therefore, reach the final conveyor as individual objects, considerably spaced apart or separated. Theoretically, this should work. Practically, it does not. One reason is that when a double is formed on the first belt, the gravity drop does not split the double again into two balls. They go over together, as a double and continue on the faster belt, still as a double.

The object of the present invention is to provide a machine of simple, efficient and inexpensive manufacture, whereby this doubling of the dough balls will be entirely eliminated.

In order to more clearly disclose the construction, operation and use of the invention, reference should be had to the accompanying drawings forming part of the present application. Throughout the several views of the drawings like reference characters designate the same parts in the several figures.

In the drawings:—

Fig. 1 is a top plan view, partly broken away;

Fig. 2 is a side elevation, with the frame broken away;

Fig. 3 is a right hand end view of Fig. 1, with the chute and lower elevator belt in section, and Fig. 4 is an enlarged detail sectional view of the clutch mechanism.

The dough balls, previously shaped by hand or any of the well known rounding up machines, are delivered into or placed in the inclined chute or trough 1 which is suitably mounted on the upper ends of the posts, standards or the like 2 carried by the base of the machine frame 3. Preferably, this connection is by deep sleeves 4 carried by wings or wide plates 5 extending from the sides or outer walls of the chute. This provides ample, strong and rigid support for the chute while loaded with a considerable number of dough balls, as well as while empty. Set screws, cotter pins or the like may be used for securing the sleeves 4 to the uprights or posts 2. On each post, directly below the chute, is securely fastened a second sleeve 6 from which extends a heavy wide metal plate 7, to the outer upper corner of which is pivoted, at 12, a long wing plate 8 the lower rear corner of which is provided with a curved or arcuate slot 9 adapted to receive a pin or bolt 10 carrying a clamping nut 11. Thus, after the wing has been adjusted about its pivot (for a purpose to be later disclosed) it may be quickly and securely clamped in its adjusted position by simply tightening the nut to bind the wing frictionally against the plate 7. The end of each wing plate carries an adjustable tubular socket 13 in which is suitably secured one end of a roll supporting rod or arm 14, the opposite end of said arm being similarly seated in and secured to a similar socket 15 extending from the bearing of a cylinder or roll 16. The plates and rods on one side are, of course, parallel with and spaced from those at the opposite side of the machine. And of course, they are complementary to each other, receiving and supporting between them the conveying mechanism. Thus, a main belt roller 17, in the form of a cylinder is journaled between and carried by the plate 6. Between the outer ends of the two wing plates are journaled the two idlers 18 and 19. A conveyor belt 20 passes about the cylinder 17, idlers 18 and 19, and roll 16, and is driven by the cylinder 17. In order to take up any undue slack and prevent possible slipping of the belt, a tightener has been provided. This comprises an upwardly swinging roll 21 adapted to engage the lower run of the belt 20. This roll is carried in the arms 22, pivoted on a rod 23 extending from one wing 8 to the other. Set screws or the like 24 secure the arms in adjusted positions to maintain the desired tightening effect of the roll 21.

It will be noticed that the path of the belt about the idlers and the outer roll 16 divides the upper run into two distinct flights separated from each other by an abrupt drop over the roll 18. The lower flight may be adjusted angularly relatively to the upper flight by means of the discs 25 journaled on short pintles 26 and carrying the sockets 13. Each disc, it will be noted, is provided with two arcuate slots 27 adapted to receive the pins 28 on the wings 8. Nuts 29 threaded on the ends of these pins may be turned down to bind the discs against the wings and, in that way, secure rods 14 and roll 16 in the desired position. From the upper edge of each wing extends a post or pin 30 from which extends an adjustable bracket 31 carrying an arm 32 secured to and supporting a guide plate 33 which rests upon the upper flight of the conveyor belt. Each arm is laterally adjustable in its bracket which is vertically adjustable on its post, giving both vertical and horizontal adjustment of the guide plates. In practice, the plates will be adjusted so that they will be substantially parallel and sufficiently spaced apart to provide plenty of room for the downward travel of the dough balls. These plates extend from the delivery end of the chute 1, to the lower end of the upper flight of the conveyor belt—just above the idler 18. A little above this point, an auxiliary guide plate 34 is adjustably connected to each main guide plate 33 by means of a bolt extending from plate 33 through plate 34 and a clamping wing nut 35. The auxiliary plates extend from the end of plate 33 across the step formed by idler 18 and down to the second flight of the conveyor belt at a point just in the rear of and above roll 16. Thus, the auxiliary plates may be adjusted to accord exactly with any adjustments of the roll 16.

Above the upper flight of the conveyor belt and slightly inclined relatively thereto is a top guide plate 36 having its ends flared or curved backwardly or upwardly as at 37 and 38, away from the belt. It is supported by bars 39 extending upwardly from the side walls of the lower end of the chute. These bars carry a cross rod 40 to which the plate 36 is rigidly secured in any suitable manner. In operation, the plate is so positioned that the upper end is spaced considerably above the upper edges of the guide plates 33, while its lower end lies between the connected ends of the plates 33 and auxiliary plates 34, and above the step leading between the upper and lower flights of the conveyor belt. Thus, it will be seen that the converging top guide, and upper flight of the conveyor, together with the side guides, cooperate to form a restricted passage at the step between the upper and lower flight or, at the point where the dough balls pass from one flight to the other, by gravity. Of course, this opening is made to accord with the dimensions of a single dough ball. Consequently, as each single ball rolls over the step, it will clear the top plate. But, if two are stuck together (as a double) the upper ball can not be pulled over along with its leader to drop, as one lump. Instead, it must drop separately, as will be clear. Thus, in case of a double the lower or forward ball will be engaged and drawn along by the lower flight of the belt while the upper is being driven by the upper flight at a considerably different inclination. Briefly, passing the balls through the restricted opening and making them drop sharply beyond one side of the opening, as they pass through, has a positive breaking action by which a double is, necessarily, broken into two singles again. Likewise, through the distance of the drop, the travel of the ball is faster than on the conveyor, so that the balls on the lower flight of the conveyor become slightly more spaced than on the upper flight, thus preventing any possible doubling after leaving what really constitutes a separator—the parts forming the opening above the roll 18.

At the end of the lower flight is arranged an elevator. This elevator may be mounted in a frame or supports entirely separate from and independent of the frame and supports of the machine above described, or in a part of the frame and supports of this same machine. The important point as to its mounting is its position relatively to the delivery end of the lower flight of the conveyor or feed belt. It must be so positioned as to securely receive the dough balls—so as to receive them in such manner that they can not drop therefrom. To that end, the elevator comprises two continuous travelling belts 41 and 42, passing about the rolls 43 and 44 and disposed in spaced relation, parallel to each other, and at a considerable incline in a direction opposite to that of the conveyor belt and travelling in an opposite direction, also, of course—that is opposite to each other. The belt 41 extends below and considerably to the rear of the delivery end of the conveyor belt and is only slightly spaced therefrom, while the lower end of the belt 42 is almost directly above (very slightly to the rear) thereof. At this point, it is just sufficiently spaced from the delivery end of the conveyor belt to permit a single dough ball to be drawn by it over the delivery end and on to the lower belt. At this point, the spacing is such that the ball is first caught between the conveyor belt and belt 42 and then between belts 42 and 41, there being practically no interval during which it is not engaged by a pair of belts working on its opposite sides. It will be noticed that the roll 16 at the delivery end, in its position relatively to the belt 41 constitutes another step down which the ball drops by gravity, assisted by the belts and, that, likewise, the spacing between the roll 16 and the lower roll of belt 42 corresponds to the spacing between the lower end of the top guide plate and the roll 18, so that the same breaking and separating effect is repeated at this point, should it be necessary.

The driving mechanism comprises a gear train 45, 46, 47, 48, 49, 50, and bevel pinions 51 and 52. The gear 45 is the main or power gear continuously driven from any suitable source of power. Each of the gears 46, 47 and 49 has its stub shaft suitably journaled in a sleeve bearing or other well known support or bracket fixed to the upright or post 2, while the gear 50 is provided with a somewhat longer shaft 53 journaled in a bearing 54 rigidly secured to the plate 7. The bevel pinion 51 carried by the shaft 53 meshes with and drives the corresponding bevel pinion 52 fixed to the shaft 55 of the cylinder or drum 17.

At times it will be desirable to stop the operation of the machine quickly, possibly. To that end, mechanism has been provided for discontinuing the drive of the drum without interrupting the operation of the gear train. This is more clearly shown, in enlarged detail sectional view, in Fig. 4. It comprises a dog 60 pivoted at 61 in a channel 62 of a stub shaft 63 which is longitudinally slidably mounted in a bore 64 in the end of the cylinder shaft 55, and also freely revoluble therein. One end of dog 60 is curved upwardly and adapted to project through a slot 65 in the enclosing end of the shaft 55, when the stub shaft is in its innermost position, as in Fig. 4. Alined with the slot 65 is a keyway or groove 100 in the hub 101 of the cylinder 17. The cylinder 17 and its hub 101 are free on the shaft 55. But when the dog is projected through slot 65 and into the groove 100, the three are clutched together and must rotate as one. A leaf spring 66 engaging the opposite end of the dog tends, at all times, to force the curved end to engaging or operative position. Consequently, the instant that the engaging end falls opposite the slot, the clutching or engaging action will be effective. To unclutch, it is only necessary to slide the stub shaft outwardly in its bore. This is accomplished by the clutch lever 67 pivoted at 68 on the frame and having the usual yoke connection with a collar 69 carried by the outer end of the stub shaft. As the stub shaft moves outwardly, the curved shoulder 70 of the locking end of the dog will be engaged by the curved or beveled end of the wall of the shaft 55 and forced inwardly so that it will no longer lock the cylinder and shaft for driving. The cylinder and rest of the machine will then come to a stop, though the gears continue to operate.

In order to avoid possible sticking of the dough balls in the chute, a dusting mechanism of any usual and well known type may be used. It forms no part of the present invention and, therefore, has not been illustrated. Preferably, it is operated by a simple eccentric and pitman rod connection as 102 and 103.

Only sufficient of the frame and supports have been shown to disclose the construction. Since the elevating mechanism may be built into the frame work of the conveyor, or into a separate framework, or may be supported on suitable uprights or posts mounted in a base, or otherwise maintained in the desired position, it is not believed necessary or desirable to illustrate such supports, as such illustration would only tend to cover or obscure the parts and arrangement actually constituting part of the invention.

It is thought that the construction, operation and use of the invention will be clear from the preceding detailed description.

Changes may be made in the construction, arrangement and disposition of the several parts of the invention within the scope of the claims and it is meant to include all such within this application wherein only one preferred form has been disclosed by way of illustration.

Having described my invention, what I claim and desire to protect by Letters Patent is:

1. A dough-ball spacing machine comprising, a continuous travelling belt mounted in inclined position and having its active run arranged in upper and lower flights at different inclinations, with a vertical drop leading from one flight to the other.

2. A dough-ball spacing machine comprising, a continuous travelling belt mounted in inclined position and having its active run arranged in upper and lower flights at different inclinations, with a vertical drop leading from one flight to the other, and guides cooperating with said belt.

3. A dough-ball spacing machine comprising a continuous travelling belt mounted in inclined position and having its active run arranged in upper and lower flights at different inclinations, with a vertical drop leading from one flight to the other, an adjustable frame determining the inclination of the upper flight, a second frame adjustably carried by the first and determining the relative inclination of the lower flight, main side guides carried by the first adjustable frame to cooperate with the upper flight of said belt, auxiliary side guides carried by the main side guides to project over the drop and cooperate with the lower flight, and means for adjusting said auxiliary side guides.

4. A dough-ball spacing machine comprising, a continuous travelling belt mounted in inclined position and having its active run arranged in upper and lower flights at different inclinations, with a vertical drop leading from one flight to the other, and means for preventing passage of more than a single dough-ball at a time from the upper flight to the lower flight.

5. In dough-ball spacing apparatus, the combination of a continuous travelling belt mounted in inclined position and having its active run arranged in upper and lower flights at different inclinations, with a vertical drop leading from one flight to the other, and an inclined elevator comprising upper and lower belts, the lower end of the upper belt being over the delivery end of said lower flight, and the lower elevator belt extending beneath said delivery end so as to receive dough-balls directly therefrom.

6. In dough-ball spacing apparatus, the combination of a continuous travelling belt mounted in inclined position and having its working run arranged in upper and lower flights at different inclinations, a vertical drop leading from one flight to the other, and an inclined elevator extending beneath and beyond the end of the lower flight of the aforesaid belt and adapted to receive dough-balls therefrom, and so disposed relatively thereto as to provide a vertical drop from the belt to the elevator.

7. In dough-ball spacing apparatus, the combination of a continuous travelling belt mounted in inclined position and having its working run arranged in upper and lower flights at different inclinations, with a vertical drop leading from one flight to the other, and an inclined elevator comprising two spaced travelling belts one extending beneath and beyond the end of the lower flight of the aforesaid belt and adapted to receive dough-balls directly therefrom and so disposed relatively thereto as to provide a vertical drop from the belt to the elevator, while the other extends to a point above the end of said lower flight and is so disposed relatively thereto as to prevent the passage of more than a single dough-ball at a time between it and the adjacent end of the said lower flight.

8. A dough-ball spacing machine comprising, a continuous travelling belt mounted in inclined position and having its active run arranged in upper and lower flights at different inclinations, with a vertical drop leading from one flight to the other, main side guides cooperating with said upper flight, and a top guide above said side guides and having its lower end disposed at a distance above said vertical drop whereby the passage of more than a single dough-ball at one time beyond such point is prevented.

In testimony whereof I hereunto affix my signature.

GEORGE M. ATTICKS.